US012633271B2

(12) United States Patent
Kim et al.

(10) Patent No.: US 12,633,271 B2
(45) Date of Patent: May 19, 2026

(54) DISPLAY DEVICE HAVING MEMORY FOR STORING DRIVING DATA AND STATE DATA, DRIVING METHOD THEREOF, AND ELECTRONIC DEVICE INCLUDING THE SAME

(71) Applicant: SAMSUNG DISPLAY CO., LTD., Yongin-si (KR)

(72) Inventors: Jin Seuk Kim, Yongin-si (KR); Jae Mo Chung, Yongin-si (KR); Jong Heon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/969,692

(22) Filed: Dec. 5, 2024

(65) Prior Publication Data

US 2025/0378799 A1 Dec. 11, 2025

(30) Foreign Application Priority Data

Jun. 5, 2024 (KR) ........................ 10-2024-0073416

(51) Int. Cl.
*G09G 5/00* (2006.01)

(52) U.S. Cl.
CPC ..... *G09G 5/003* (2013.01); *G09G 2310/0275* (2013.01); *G09G 2330/022* (2013.01); *G09G 2330/027* (2013.01); *G09G 2354/00* (2013.01)

(58) Field of Classification Search
CPC ...................................................... G09G 5/003
USPC .......................................................... 345/204
See application file for complete search history.

(56) References Cited

U.S. PATENT DOCUMENTS

2018/0284967 A1* 10/2018 Lee ....................... G06F 3/1454
2020/0294185 A1* 9/2020 Bae ......................... G06F 1/163
2021/0109623 A1* 4/2021 Bae ....................... G06F 1/3287
2023/0020515 A1 1/2023 Min et al.

FOREIGN PATENT DOCUMENTS

KR 10-2023-0013689 1/2023

* cited by examiner

*Primary Examiner* — Long D Pham
(74) *Attorney, Agent, or Firm* — F. CHAU & ASSOCIATES, LLC

(57) ABSTRACT

A display device includes a processor configured to provide input image data, a display driver configured to display an image on a display panel based on the input image data and generate driving data for operating the display panel, and a memory configured to store the driving data and state data indicating whether communication with the display driver is possible. The display driver determines whether the state data is a first value when entering a sleep-out mode from a sleep-in mode, and changes the state data to the first value when the state data is not the first value.

22 Claims, 5 Drawing Sheets

DISPLAY DEVICE HAVING MEMORY FOR STORING DRIVING DATA AND STATE DATA, DRIVING METHOD THEREOF, AND ELECTRONIC DEVICE INCLUDING THE SAME

This patent application claims priority under 35 U.S.C. § 119 to Korean Patent Application No. 10-2024-0073416, filed on Jun. 5, 2024, the disclosure of which is incorporated by reference in its entirety herein.

1. TECHNICAL FIELD

The disclosure is directed to a display device and a method of driving the same.

2. DISCUSSION OF RELATED ART

A display device is a connection medium between a user and information. Examples of the display device include a liquid crystal display device, an organic light emitting display device, and an inorganic light emitting display device.

The display device may provide sleep-in and sleep-out modes to reduce power consumption. When the display device is not being actively used, it may enter the sleep-in mode, which is a low-power state in which the display device reduces or suspends many of its operational functions to conserve energy. The sleep-out mode is a state where the display device is active or "woken up" from the low-power state to resume its full operations such as displaying images.

A display driver of the display device may store data related to displaying images in a memory. However, when the display device enters the sleep-out mode, a communication failure may occur between the display driver and the memory.

SUMMARY

An object of the disclosure is to provide a display device and a method of driving the same preventing communication failure between a display driver and a memory.

According to an embodiment of the disclosure, a display device includes a processor configured to provide input image data, a display driver configured to display an image on a display panel based on the input image data and generate driving data for controlling the display panel, and a memory configured to store the driving data and state data indicating whether communication with the display driver is possible, and the display driver determines whether the state data is a first value when entering a sleep-out mode from a sleep-in mode, and changes the state data to the first value when the state data is not the first value.

In embodiments, the display driver may output a first read request to the memory when entering the sleep-out mode, the memory may output a first data value to the display driver based on the first read request, and the first data value may be a value of the state data read in response to the first read request.

In embodiments, when the first data value is not the first value, the display driver may output a write request to the memory to set the state data to the first value in the memory.

In embodiments, after outputting the write request as the state data, the display driver may output a second read request to the memory, the memory may output a second data value to the display driver based on the second read request, and the second data value may be a value of the state data read in response to the second read request.

In embodiments, when the second data value is not the first value, the display driver may output a power request to the processor, and the power request may be for requesting that a power-off/on of the display driver and the memory be performed.

In embodiments, the processor may power off/on the display driver and the memory based on the power request, and the power-off/on may turn off and then turn on the display driver and the memory, and the processor may maintain a turn-on state.

In embodiments, the display driver may output the driving data to the memory when the second data value is the first value.

In embodiments, the display driver may output the driving data to the memory when the first data value is the first value.

In embodiments, in the sleep-in mode, the processor may be in a turn-on state and the display driver may be in a turn-off state, and in the sleep-out mode, both the processor and the display driver may be in a turn-on state.

In embodiments, the driving data may include at least one of grayscale voltages provided to pixels of the display panel and accumulation stress for each pixel of the display panel.

According to an embodiment of the disclosure, a method of driving a display driver receives input image data from a processor and communicates with a memory that stores state data includes determining whether the state data is a first value when entering a sleep-out mode from a sleep-in mode, and changing the state data to the first value when the state data is not the first value, and the state data indicates whether communication between the display driver and the memory is possible.

In embodiments, determining whether the state data is the first value when entering the sleep-out mode from the sleep-in mode may include outputting a first read request to the memory when entering the sleep-out mode, and comparing the first value with a first data value read based on the first read request.

In embodiments, the method may further include outputting driving data to the memory when the first data value is the same as the first value, and the driving data may indicate a state of the display panel based on the input image data.

In embodiments, the driving data may include at least one of grayscale voltages provided to pixels of the display panel and accumulation stress for each pixel of the display panel.

In embodiments, the method may further include outputting a write request for setting the state data in the memory to the first value, when the first data value is different from the first value.

In embodiments, the method may further include outputting a second read request to the memory after outputting the write request to the memory, and comparing the first value with a second data value read based on the second read request.

In embodiments, the method may further include outputting driving data to the memory when the second data value and the first value are the same, and the driving data may indicate a state of the display panel based on the input image data.

In embodiments, the method may further include outputting a power request requesting that the display driver and the memory be powered off/on to the processor when the second data value is different from the first value.

In embodiments, in the sleep-in mode, the processor may be in a turn-on state and the display driver is in a turn-off state, and in the sleep-out mode, both the processor and the display driver may be in turn-on state.

According to an embodiment of the disclosure, a method of operating a display device including a display driver that displays an image on a display panel, and a memory that stores state data indicating whether communication with the display driver is possible includes determining whether the state data is a first value when entering a sleep-out mode from a sleep-in mode, and changing the state data to the first value when the state data is not the first value.

According to an embodiment of the disclosure, a display device includes a processor configured to provide input image data, a memory configured to store state data and a display driver configured to store driving data in the memory for operating the display panel based on the input image data when the state data indicates communication is possible, and display an image on a display panel based on the input image data and the stored driving data. The display driver reads a value of the state data in the memory and sets the state data in the memory to indicate communication is possible when the read value indicates communication is not possible, when entering a sleep-out mode from a sleep-in mode.

According to an embodiment of the disclosure, an electronic device comprises a processor configured to provide input image data, and a display device configured to display an image on a display panel based on the input image data, wherein the display device comprises a display driver generating driving data for operating the display panel, and a memory configured to store the driving data and state data indicating whether communication with the display driver is possible, wherein the display driver determines whether the state data is a first value when entering a sleep-out mode from a sleep-in mode, and changes the state data to the first value when the state data is not the first value.

Reliability of the display device according to at least one embodiment of the disclosure may be increased by preventing communication failure between the display driver and the memory.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
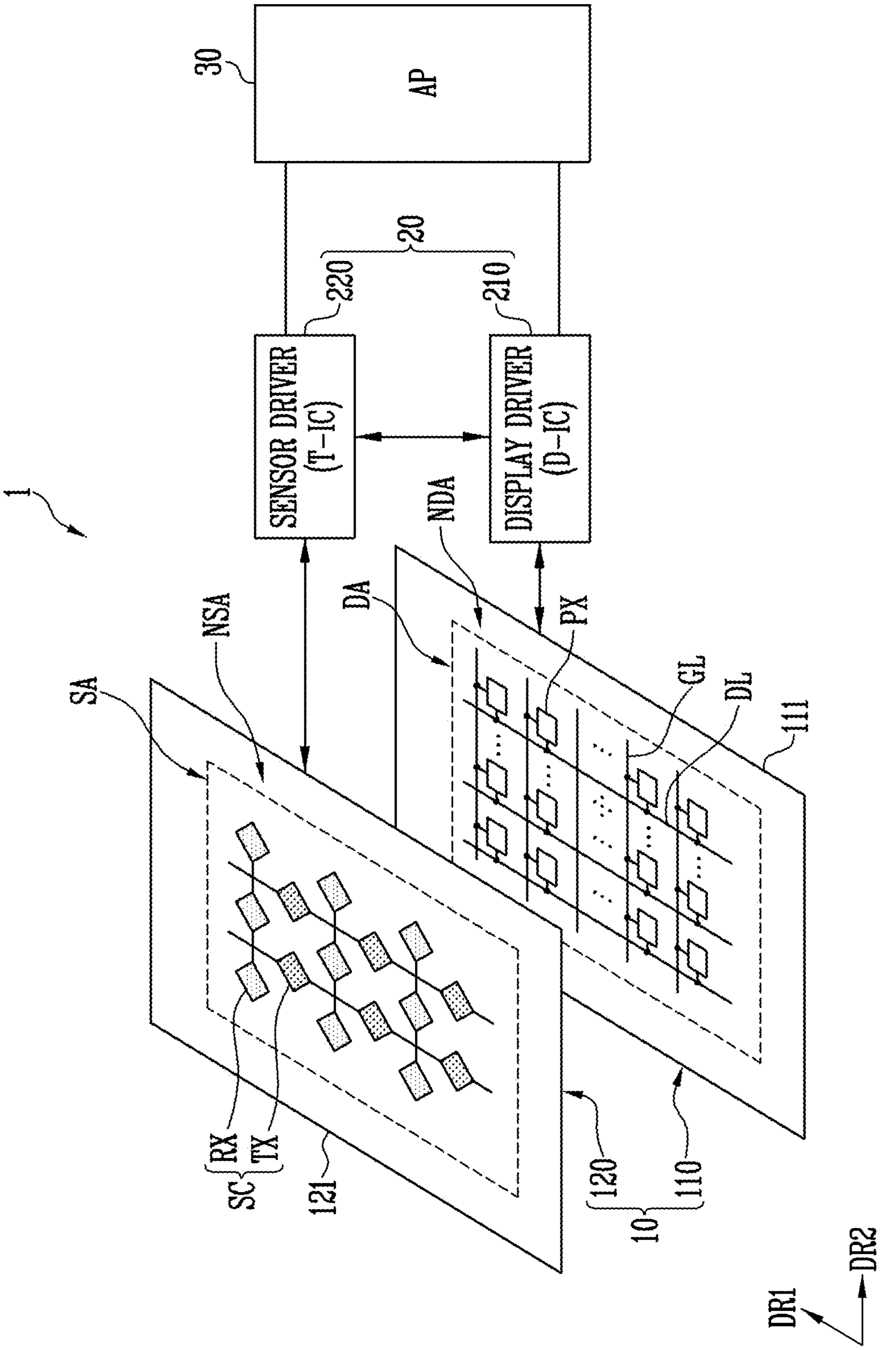
FIG. 1 is a block diagram illustrating a display device according to an embodiment of the disclosure.

Hereinafter, embodiments according to the disclosure are described in detail with reference to the accompanying drawings. It should be noted that in the following description, only portions necessary for understanding an operation according to the disclosure are described, and descriptions of other portions may be omitted so as not to obscure the subject matter of the disclosure. In addition, the disclosure may be embodied in other forms without being limited to the embodiments described herein. The embodiments herein are described in enough detail to allow those skilled in the art to implement the same.

Throughout the specification, in a case where a portion is “connected” to another portion, the case includes not only a case where the portion is “directly connected” but also a case where the portion is “indirectly connected” with another element interposed therebetween. Terms used herein are for describing specific embodiments and are not intended to limit the disclosure. Throughout the specification, in a case where a certain portion “includes”, the case means that the portion may further include another component without excluding another component unless otherwise stated. “At least any one of X, Y, and Z” and “at least any one selected from a group consisting of X, Y, and Z” may be interpreted as one X, one Y, one Z, or any combination of two or more of X, Y, and Z (for example, XYZ, XYY, YZ, and ZZ). Here, “and/or” includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as “under”, “on”, and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned “under” other elements or features are positioned in a direction “on” the other elements or features. Therefore, in an embodiment, the term “under” may include both directions of on and under. In addition, the device may face in other directions (for example, rotated 90 degrees or in other directions) and thus the spatially relative terms used herein are interpreted according thereto.

Various embodiments are described with reference to drawings, which may illustrate ideal embodiments. Accordingly, it will be expected that shapes may vary, for example, according to tolerances and/or manufacturing techniques. Therefore, the embodiments disclosed herein should not be construed as being limited to shown specific shapes, and should be interpreted as including, for example, changes in shapes that occur as a result of manufacturing.

FIG. 1 is a diagram illustrating a display device according to an embodiment of the disclosure.

Referring to FIG. 1, the display device 1 includes a panel 10 and a driving circuit unit 20 for driving the panel 10. In addition, the display device 1 may further include an application processor 30.

The panel 10 may include a display unit 110 (e.g., a display panel) for displaying an image and a sensor unit 120 (e.g., a touch panel) for sensing touch, pressure, fingerprint, hovering, biometric information (or a biometric characteristic), and the like. For example, the display unit 110 may include pixels PX and the sensor unit 120 may include sensors SC positioned to overlap at least a portion of the pixels PX. In an embodiment, the sensors SC may include first sensors TX (or a driving electrode) and second sensors RX (or a sensing electrode). In another embodiment (for example, in a self-capacitance mode), the sensors SC may be configured as one type of sensors without distinction between the first sensors TX and the second sensors RX.

The driving circuit unit 20 (e.g., a driving circuit) may include a display driver 210 (e.g., a first driver circuit) for driving the display unit 110 and a sensor driver 220 (e.g., a second driver circuit) for driving the sensor unit 120. For example, the pixels PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous.

According to an embodiment, the display unit 110 and the sensor unit 120 may be separately manufactured, and then disposed and/or combined so that at least one area overlaps. Alternatively, in another embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various functional layer (for example, an optical layer or a protective layer).

While, in FIG. 1, the sensor unit 120 is disposed on a front surface (for example, an upper surface on which an image is displayed) of the display unit 110, but a position of the sensor unit 120 is not limited thereto. For example, in another embodiment, the sensor unit 120 may be disposed on a back surface or both surfaces of the display unit 110. In still another embodiment, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include a display area DA where an image is displayed and a non-display area NDA outside the display area DA. According to an embodiment, the display area DA may be disposed in a center area of the display unit 110, and the non-display area NDA may be disposed in an edge area of the display unit 110 to surround the display area DA.

The display substrate 111 may be a rigid substrate or a flexible substrate, but a material or a physical property of the display substrate 111 is not limited thereto. For example, the display substrate 111 may be a rigid substrate configured of organic or tempered glass, or a flexible substrate configured of a thin film of a plastic or metal material.

Gate lines GL, data lines DL, and the pixels PX connected to the gate lines GL and the data lines DL are disposed in the display area DA. The pixels PX are selected by a gate signal of a turn-on level supplied from the gate lines GL, receive a data signal from the data lines DL, and emit light of a luminance corresponding to the data signal. Therefore, an image corresponding to the data signal is displayed in the display area DA. In the disclosure, a structure, a driving method, and the like of the pixels PX are not particularly limited. For example, each of the pixels PX may be implemented with a pixel employing various structures and driving methods.

In the non-display area NDA, various lines and/or a built-in circuit unit connected to the pixels PXL of the display area DA may be disposed. For example, a plurality of lines for supplying various power and control signals to the display area DA may be disposed in the non-display area NDA, and a gate driver providing the gate signals or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, the light emitting element of each of the pixels PX may be configured of an organic light emitting diode, an inorganic light emitting diode, a quantum dot/well light emitting diode, or the like. A plurality of light emitting elements may be provided in each of the pixels PX. At this time, the plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors SC formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the touch input or the like is provided on the display area DA, the touch input may be detected through the sensor unit 120.

The sensor substrate 121 may be a rigid or flexible substrate, and may be configured of at least one insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate configured of glass or tempered glass, or a flexible substrate configured of a thin film of a plastic or metal material. In addition, according to an embodiment, at least one substrate (for example, the display substrate 111, an encapsulation substrate and/or a thin film encapsulation layer) configuring the display unit 110, an insulating layer, a functional layer, or the like of at least one layer disposed in an inside and/or on an outer surface of the display unit 110 may be used as the sensor substrate 121.

The sensing area SA is set as an area capable of responding to the touch input (that is, an active area of a sensor). To this end, the sensors SC for sensing the touch input or the like may be disposed in the sensing area SA. According to an embodiment, the sensors SC may include the first sensors TX and the second sensors RX.

For example, each of the first sensors TX may extend in a first direction DR1. The first sensors TX may extend in a second direction DR2. The second direction DR2 may be different from the first direction DR1. For example, the second direction DR2 may be a direction crossing the first direction DR1. In another embodiment, an extension direction and an arrangement direction of the first sensors TX may follow other configurations. Each of the first sensors TX may have a form in which first cells of a relatively large area and first bridges of a relatively narrow area are connected. In addition, in FIG. 1, each of the first cells is shown in a diamond shape, but each of the first cells may be configured to have various shapes such as a circle, a quadrangle, a triangle, and a mesh form. For example, the first bridges may be integrally formed on the same layer as the first cells. In another embodiment, the first bridges may be formed on a layer different from that of the first cells and may electrically connect adjacent first cells.

For example, each of the second sensors RX may extend in the second direction DR2. The second sensors RX may be arranged in the first direction DR1. In another embodiment, an extension direction and an arrangement direction of the second sensors RX may follow another configuration. Each of the second sensors RX may have a form in which second cells of a relatively large area and second bridges of a relatively narrow area are connected. In FIG. 1, each of the second cells is shown as having a diamond shape, but may be configured to have various shapes such as a circle, a quadrangle, a triangle, and a mesh form. For example, the second bridges may be integrally formed on the same layer as the second cells. In another embodiment, the second bridges may be formed in a layer different from that of the second cells and may electrically connect adjacent second cells.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. At this time, the first sensors TX and the second sensors RX may be configured in a mesh form. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and the like. In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited.

Sensor lines for electrically connecting the first and second sensors TX and RX to the sensor driver 220 and the like may be intensively disposed in the peripheral area NSA of the sensor unit 120.

The driving circuit unit 20 may include the display driver 210 for driving the display unit 110 and the sensor driver 220 for driving the sensor unit 120. In an embodiment, the display driver 210 and the sensor driver 220 may be configured of integrated chips (ICs) separated from each other. In another embodiment, at least a portion of the display driver 210 and the sensor driver 220 may be integrated together in one IC.

The display driver 210 is electrically connected to the display unit 110 to drive the pixels PX. For example, the display driver 210 may include a data driver 113 and a controller 115, and the gate driver may be separately mounted in the non-display area NDA of the display 110. In another embodiment, the display driver 210 may include all or at least a portion of the data driver, the controller, and the gate driver. A more detailed description of the display driver 210 is provided below together with FIG. 2.

The sensor driver 220 is electrically connected to the sensor unit 120 to drive the sensor unit 120. The sensor driver 220 may include a touch controller, an oscillator, and the like.

The touch controller may supply a touch signal to the first sensors TX (and/or the second sensors RX) so that a touch may be sensed, and receive a sensing signal corresponding to the touch signal from the second sensors RX (and/or the first sensors TX). To this end, the touch controller may include a sensor transmitter for supplying the touch signal and a sensor receiver for receiving the sensing signal.

The oscillator may generate a clock signal inside the sensor driver 220. The touch controller may divide the clock signal supplied from the oscillator to generate various control signals. For example, the touch controller may divide the clock signal to generate the touch signal.

The application processor 30 may be electrically connected to the display driver 210 and the sensor driver 220. The application processor 30 may provide grayscales (grayscales data) and timing signals for a display frame period to the display driver 210. In addition, the application processor 30 may provide timing signals and firmware to the sensor driver 220. The application processor 30 may correspond to at least one of a graphics processing unit (GPU), a central processing unit (CPU), and an application processor (AP).

Figure 2:
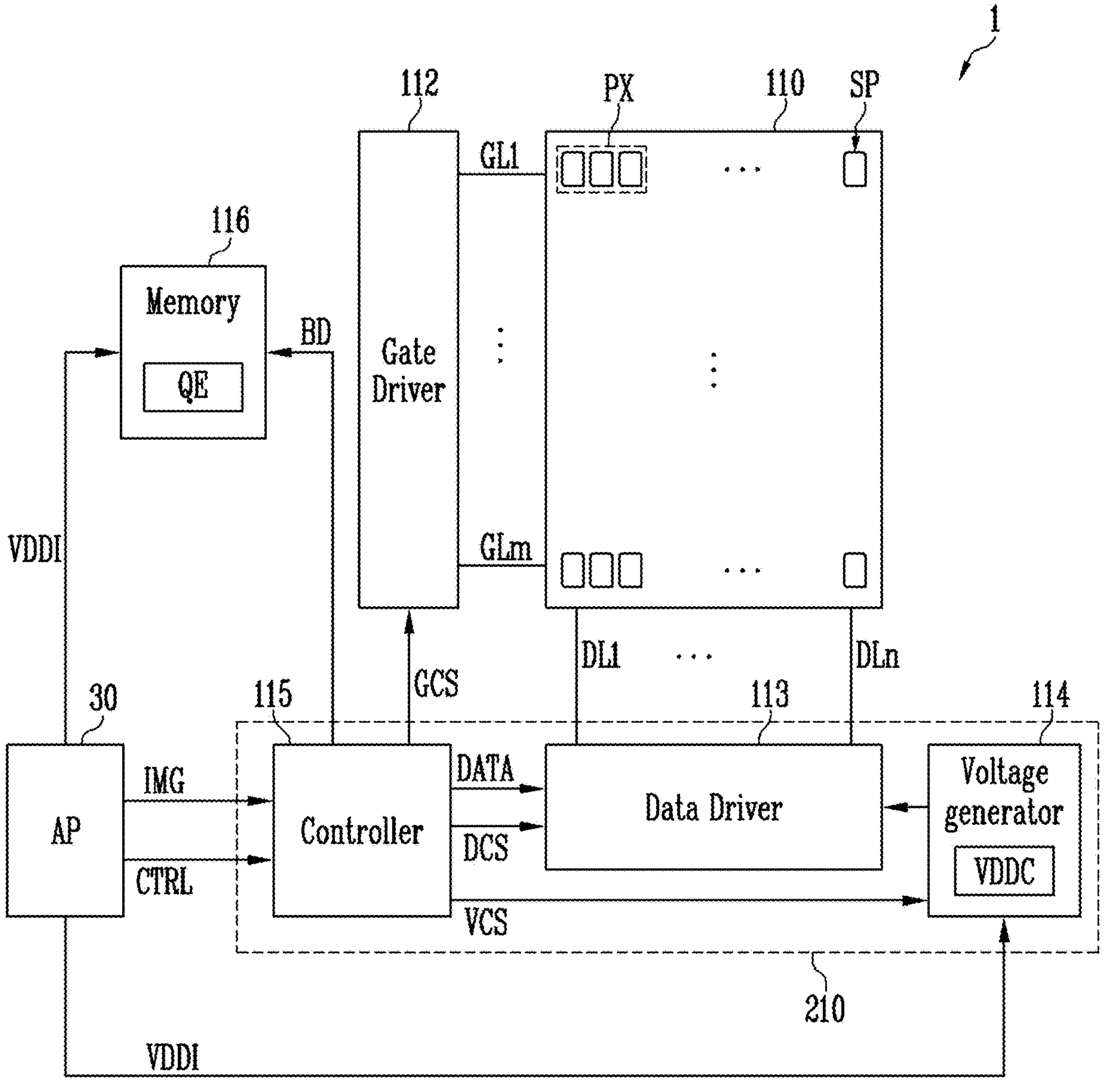
FIG. 2 is a block diagram illustrating a display device according to an embodiment of the disclosure.

FIG. 2 is a block diagram illustrating a display device according to an embodiment of the disclosure.

Referring to FIG. 2, the display device 1 may include an application processor 30, a display unit 110, a gate driver 112 (e.g., a first driver circuit), a data driver 113 (e.g., a second driver circuit), a voltage generator 114, a controller 115 (e.g., a controller circuit), and a memory 116.

The display unit 110 includes sub-pixels SP. The sub-pixels SP may be connected to the gate driver 112 through first to m-th gate lines GL1 to GLm. The sub-pixels SP may be connected to the data driver 113 through first to n-th data lines DLI to DLn.

Each of the sub-pixels SP may include at least one light emitting element configured to generate light. Accordingly, each of the sub-pixels SP may generate light of a specific color such as red, green, blue, cyan, magenta, or yellow. Two or more sub-pixels among the sub-pixels SP may configure one pixel PX. For example, as shown in FIG. 1, three sub-pixels may configure one pixel PX.

The gate driver 112 is connected to the sub-pixels SP arranged in a row direction through the first to m-th gate lines GL1 to GLm. The gate driver 112 may output gate signals to the first to m-th gate lines GL1 to GLm in response to a gate control signal GCS. In embodiments, the gate control signal GCS may include a start signal indicating a start of each frame, a horizontal synchronization signal for outputting the gate signals in synchronization with a timing at which data signals are applied, and the like.

In embodiments, first to m-th emission control lines connected to the sub-pixels SP of the row direction may be further provided. In this case, the gate driver 112 may include an emission control driver configured to control the first to m-th emission control lines, and the emission control driver may operate under control of the controller 115.

The gate driver 112 may be disposed on one side of the display unit 110. However, embodiments are not limited thereto. For example, the gate driver 112 may be divided into two or more physically and/or logically separated drivers, and such drivers may be disposed on one side of the display unit 110 and another side of the display unit 110 opposite to the one side. As described above, the gate driver 112 may be disposed around the display unit 110 in various forms according to embodiments.

The data driver 113 is connected to the sub-pixels SP arranged in a column direction through the first to n-th data lines DLI to DLn. The data driver 113 receives image data DATA and data control signal DCS from the controller 115. The data driver 113 operates in response to the data control signal DCS. In embodiments, the data control signal DCS may include a source start pulse, a source shift clock signal, a source output enable signal, and the like.

The data driver 113 may apply data signals having grayscale voltages corresponding to the image data DATA to the first to n-th data lines DLI to DLn using voltages from the voltage generator 114. When a gate signal is applied to each of the first to m-th gate lines GL1 to GLm, the data signals corresponding to the image data DATA may be applied to the data lines DLI to DLm. Accordingly, the corresponding sub-pixels SP may generate light corresponding to the data signals. Accordingly, an image is displayed on the display unit 110.

In embodiments, the gate driver 112 and the data driver 113 may include complementary metal-oxide semiconductor (CMOS) circuit elements.

The voltage generator 114 may operate in response to a voltage control signal VCS from controller 115. The voltage generator 114 is configured to generate a plurality of voltages and provide the generated voltages to components of the display device 1.

In embodiments, the voltage generator 114 may be configured to generate the plurality of voltages by receiving an input voltage VDDI from the application processor 30 of the display device 1, adjusting the received voltage, and regulating the adjusted voltage. For example, the voltage generator 114 may generate a driving voltage VDDC that drives the components of the display device 1 based on the input voltage VDDI.

The controller 115 controls overall operations of the display device 1. The controller 115 receives input image data IMG and a control signal CTRL for controlling display of the input image data IMG from the application processor AP. The controller 115 may provide the gate control signal GCS, the data control signal DCS, and the voltage control signal VCS in response to the control signal CTRL.

The controller 115 may convert the input image data IMG to image data DATA in a format suitable for the display device 1 or the display unit 110 and output the image data DATA. In embodiments, the controller 115 may output the image data DATA by aligning the input image data IMG in a format suitable for the sub-pixels SP of a row unit.

Two or more components of the data driver 113, the voltage generator 114, and the controller 115 may be mounted on one integrated circuit. As shown in FIG. 2, the data driver 113, the voltage generator 114, and the controller 115 may be included in one integrated circuit to configure the display driver 210. In this case, the data driver 113, the voltage generator 114, and the controller 115 may be functionally distinguished components in one integrated circuit.

In embodiments, the controller 115 may cause the display device 1 to sleep in/out. At this time, sleep in/out means turning off and then turning on the display driver 210, and the application processor AP maintains a turn-on state. For example, the controller 115 may cause the display device 1 to sleep in/out by controlling the voltage generator 114 to generate the driving voltage VDDC.

The display device 1 may further include a memory 116. In an embodiment, the memory 116 may be a non-volatile memory. For example, the memory 116 may be implemented as a non-volatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM). The application processor 30 may provide the input voltage VDDI to the memory 116.

In embodiments, the application processor 30 may power off/on the display driver 210 and the memory 116. At this time, power off/on means that the display driver 210 and the memory 116 are turned off and then turned on, and the application processor AP maintains a turn on state. For example, the application processor AP may not provide or may provide the input voltage VDDI to the display driver 210 and the memory 116 to power off/on the display driver 210 and the memory 116.

The controller 115 may periodically transmit driving data BD to the memory 116. The driving data BD may include or indicate a state of the display unit 110 while an image is displayed on the display unit 110. For example, the driving data may include grayscale voltages provided to the pixels and accumulation stress for each pixel. The driving data BD may include values that represent the grayscale voltages provided to all or some the pixels during a frame period. The accumulation stress may be used to adjust the greyscale voltages to generate adjusted grayscales voltages to be provided to all or some of the pixels during the frame period. The driving data BD may be considered driving data for operating the display unit 110. The controller 115 may generate the driving data BD based on the input image data IMG and the control signal CTRL.

The memory 116 may include state data QE indicating whether communication with the controller 115 is possible. When the state data QE is a first value, the memory 116 may communicate with controller 115. When the state data QE is a second value, the memory 116 may not communicate with the controller 115. For example, the first value may be ‘1’ and the second value may be ‘0’.

In an embodiment, the controller 115 periodically stores the driving data BD in the memory 116 when the state data QE of the memory 116 is the first value. Thus, the state data QE of the memory 116 is required to maintain the first value to enable this periodic storage of the driving data BD.

The controller 115 may continuously delete previously stored driving data BD and store new driving data BD when periodically storing the driving data BD in the memory 116. However, in a process in which the controller 115 deletes the previously stored driving data BD, when the display device 1 enters the sleep-in mode, the state data QE may change from the first value to the second value. Even though the display device 1 enters the sleep-out mode, since the state data QE is still the second value, a communication failure between the controller 115 and the memory 116 may occur. In an embodiment of the sleep-in mode, the application processor 30 is in a turn-on state and the display driver 210 is in a turn-off state. In an embodiment of the sleep-out mode, both of the application processor 30 and the display driver 210 are in a turn-on state.

Accordingly, in an embodiment, when the display device 1 enters the sleep-out mode from the sleep-in mode, the display driver 210 changes the state data QE to the first value through a first operation. A more detailed description of the first operation is described below together with FIG. 3.

However, the state data QE may not be changed to the first value even through the first operation is performed. More specifically, in a process in which the voltage generator 114 generates the driving voltage VDDC, a voltage level of the input voltage VDDI transmitted to the memory 116 may become lower than a voltage level required to turn on the memory 116, and thus the memory 116 may enter an unknown state. The unknown state is a state in which it is unknown whether the memory 116 is turned on or turned off. Accordingly, a communication failure may occur between the controller 115 and the memory 116, and the controller 115 may not be able to check the state data QE.

When the state data QE is not changed through the first operation, the display driver 210 is able to check whether the state data QE is the first value through a second operation. A more detailed description of the second operation is described later together with FIG. 4.

That is, the display driver 210 may enter the sleep-out mode from the sleep-in mode and may perform the first operation or perform both of the first and second operations before storing the driving data BD in the memory 116. Accordingly, communication failure between the display driver 210 and the memory 116 may be prevented, and reliability of the display device 1 may be increased.

In FIGS. 1 and 2, the display device 1 is illustrated as including the application processor 30, but the disclosure is not limited thereto, and the application processor 30 may be configured separately from the display device 1.

According to embodiments, an electronic device may include the application processor 30 and the display device including the panel 10 and the driving circuit unit 20.

Figure 3:
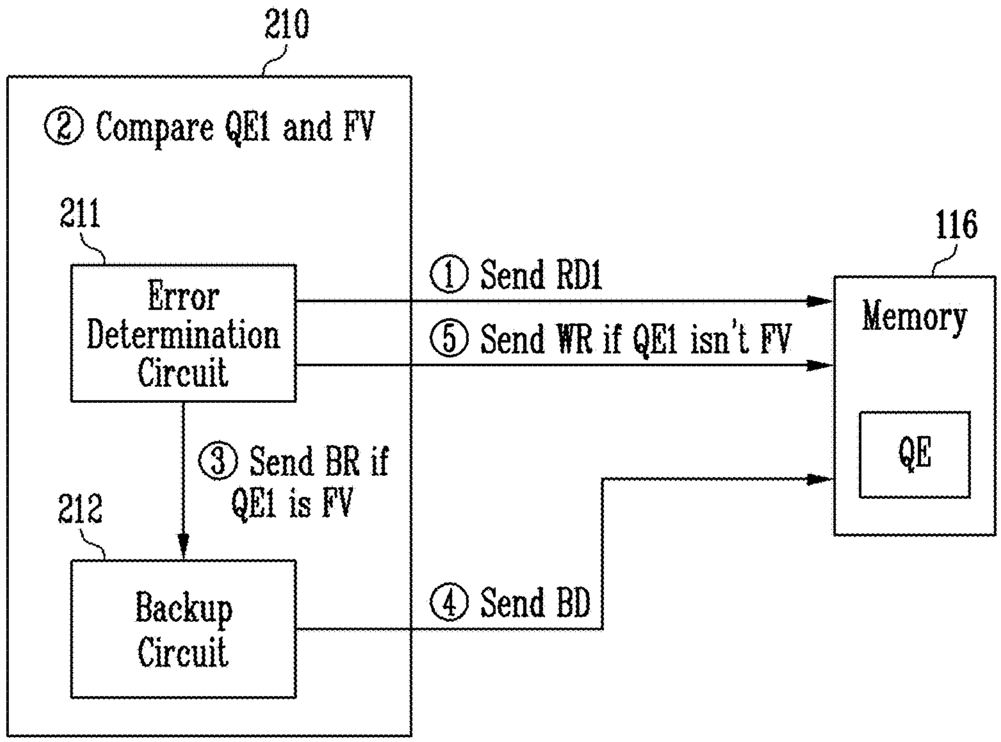
FIG. 3 is a diagram illustrating a first operation of a display driver of the display device according to an embodiment of the disclosure.

FIG. 3 is a diagram illustrating the first operation of the display driver according to an embodiment.

Referring to FIG. 3, the display driver 210 may include an error detection or determination circuit 211 and a backup circuit 212.

The display driver 210 may perform the first operation when the display device 1 enters the sleep-out mode from the sleep-in mode. The first operation may be an operation of outputting the driving data BD to the memory 116 or changing the state data QE of the memory 116 to the first value according to whether the state data QE of the memory 116 is the first value FV.

In a first step ①, when entering the sleep-out mode from the sleep-in mode, the error detection circuit 211 transmits a first read request RD1 to the memory 116. The first read request RD1 may be a request to check a value of the state data QE of the memory 116. Assuming the memory 116 is receiving enough power to operate, the memory 116 may transmit a first data value QE1 of the state data QE to the display driver 210 in response to receiving the first read request RD1.

In a second step ②, the error detection circuit 211 compares the first data value QE1 and the first value FV. The first data value QE1 may be a value of the state data QE read in response to the first read request RD1. The first value FV may be '1.

In a third step ③, when the first data value QE1 and the first value FV are the same, the error detection circuit 211 transmits a backup request BR to the backup circuit 212. The backup request BR may be a request to store the driving data BD in the memory 116. In an embodiment, the backup circuit 212 includes a memory that stores the driving data BD.

In a fourth step ④, the backup circuit 212 transmits the driving data BD to the memory 116 in response to the backup request BR. Thereafter, the display driver 210 may end the first operation and periodically transmit the driving data BD to the memory 116. In embodiments, the display driver 210 may periodically transmit the driving data BD to the memory 116 until the display device 1 enters the sleep-in mode again.

In a fifth step ⑤, when the first data value QE1 and the first value FV are different, the error detection circuit 211 transmits a write request WR to the memory 116. The write request WR may write the state data QE of the memory 116 as the first value. Thereafter, the display driver 210 may end the first operation and perform the second operation.

Figure 4:
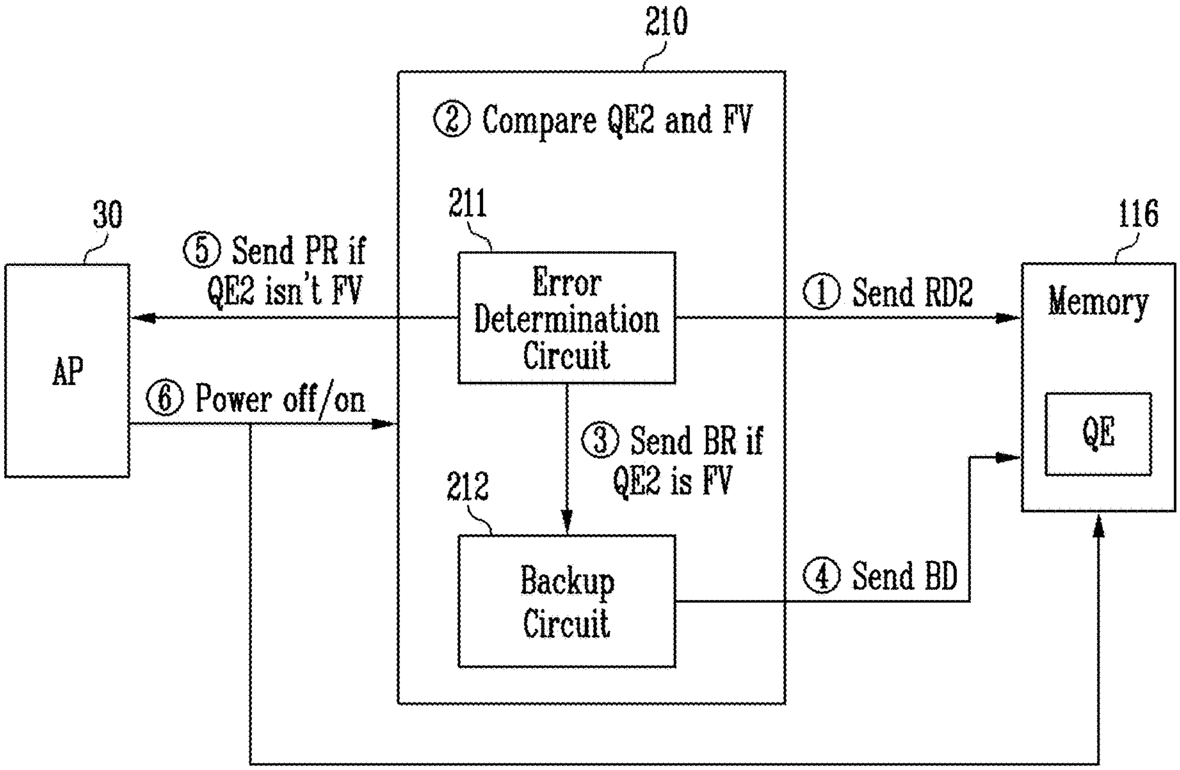
FIG. 4 is a diagram illustrating a second operation of the display driver according to an embodiment of the disclosure.

FIG. 4 is a diagram illustrating the second operation of the display driver according to an embodiment.

Referring to FIG. 4, the display driver 210 may include an error detection circuit 211 and a backup circuit 212. Since the error detection circuit 211 and the backup circuit 212 of FIG. 4 are similar to the error detection circuit 211 and the backup circuit 212 of FIG. 3, an overlapping description is omitted.

After the display driver 210 performs the fifth step ⑤ of the first operation, the display driver 210 may perform the second operation. In an embodiment, the second operation is an operation of transmitting the driving data BD to the memory 116 or powering off/on the memory 116 and the display driver 210 according to whether the state data QE of the memory 116 is the first value FV.

In a first step ①, when the first operation is ended, the error detection circuit 211 transmits a second read request RD2 to the memory 116. The second read request RD2 may be a request to check a value of the state data QE of the memory 116. The memory 116 may transmit a second data value QE2 of the state data QE to the display driver 210 in response to receiving the second read request RD2.

In a second step ②, the error detection circuit 211 compares the second data value QE2 with the first value FV. The second data value QE2 may be a value of state data QE read in response to the second read request RD2. The first value FV may be '1'.

In a third step ③, when the second data value QE2 and the first value FV are the same, the error detection circuit 211 transmits a backup request BR to the backup circuit 212. The backup request BR may be a request to store the driving data BD in the memory 116.

In a fourth step ④, the backup circuit 212 transmits the driving data BD to the memory 116 in response to the backup request BR. Thereafter, the display driver 210 may end the second operation and periodically transmit the driving data BD to the memory 116. In embodiments, the display driver 210 may periodically transmit the driving data BD to the memory 116 until the display device 1 enters the sleep-in mode again.

In a fifth step ⑤, when the second data value QE2 and the first value FV are different, the error detection circuit 211 transmits a power request PR to the application processor 30. The power request PR may request that the display driver 210 and the memory 116 be powered off/on.

In a sixth step ⑥, the application processor 30 powers off/on the display driver 210 and the memory 116 in response to the power request PR. In embodiments, referring to FIG. 2, the application processor 30 does not provide the input voltage VDDI to the display driver 210 and the memory 116, and then provides the input voltage VDDI again to the display driver 210 and the memory 116 to perform the power off/on.

In response to the power request RP, in an embodiment, the application processor 30 does not provide the input voltage VDDI and then provides the input voltage VDDI again in a short time, and thus a discharge time of the input voltage VDDI may be insufficient. Accordingly, when the application processor 30 provides the input voltage VDDI again, a voltage level of the input voltage VDDI transmitted to the memory 116 may be charged highly compared to a voltage level required to turn on the memory 116. That is, even though the voltage generator 114 generates the driving voltage VDDC based on the input voltage VDDI, the memory 116 may maintain a turn-on state that is not the unknown state.

As the memory 116 is normally turned on, the display driver 210 may check the state data QE of the memory 116. In embodiments, the memory 116 may maintain existing state data QE. The existing state data QE may be the first value. When the state data QE is the first value, the display driver 210 may periodically transmit the driving data BD to the memory 116 until the display device 1 enters the sleep-in mode again.

Figure 5:
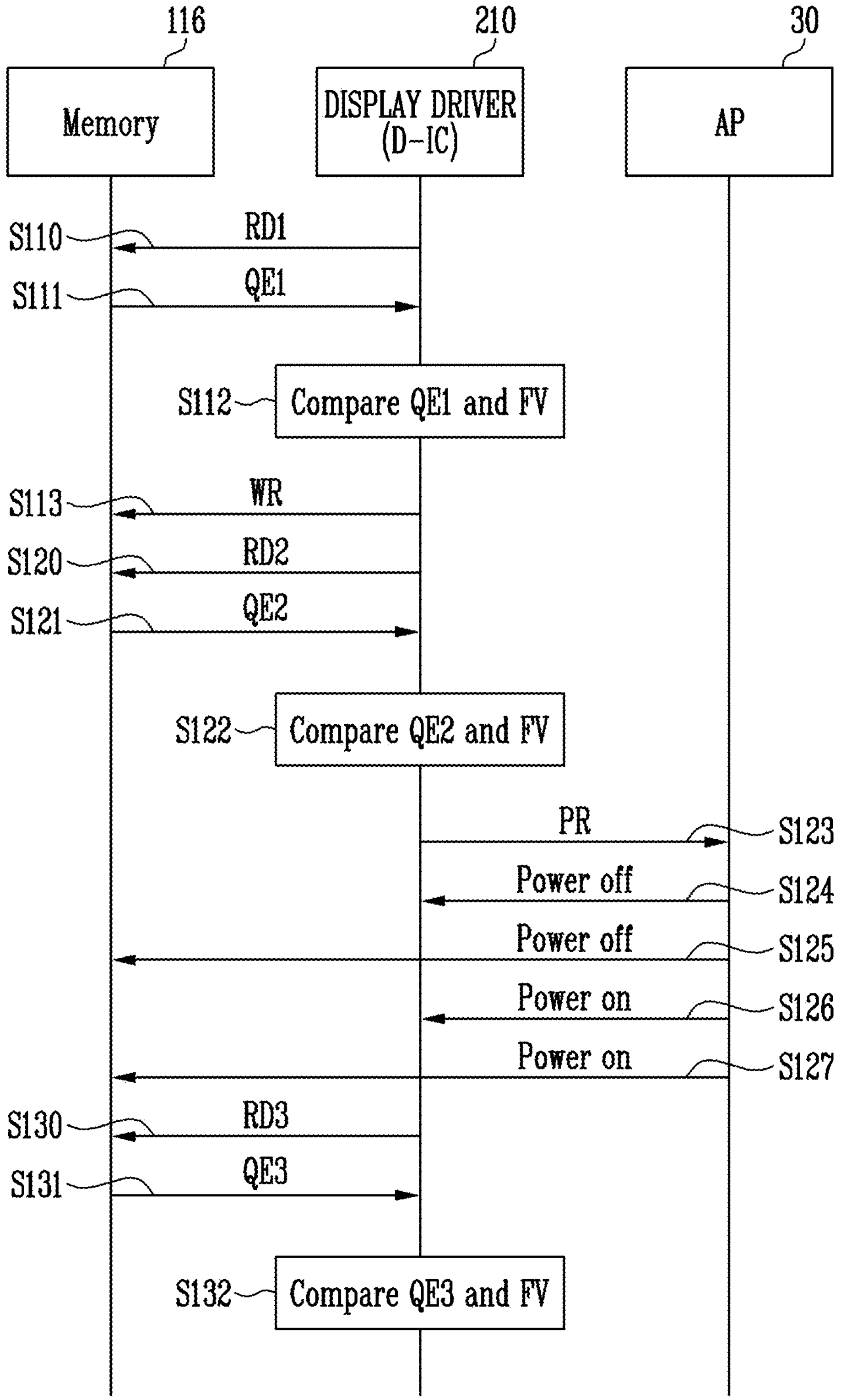
FIG. 5 is a diagram illustrating a method of operating a display device according to an embodiment of the disclosure.

FIG. 5 is a diagram illustrating a method of operating a display device according to an embodiment of the disclosure.

Referring to FIGS. 3 to 5, a method of operating the memory 116, the display driver 210, and the application processor 30 according to an embodiment is shown.

Steps S110, S111, S112, and S113 may be similar to the first operation of FIG. 3. Steps S120, S121, S122, S123, S124, S125, S126, and S126 may be similar to the second operation of FIG. 4. Accordingly, an overlapping description may be omitted.

In step S110, the display driver 210 outputs the first read request RD1 to the memory 116. In embodiments, the display driver 210 may perform step S110 when entering the sleep-out mode.

In step S111, the memory 116 outputs the first data value QE1 to the display driver 210 in response to the first read request RD1.

In step S112, the display driver 210 compares the first data value QE1 with the first value FV.

In step S113, when the first data value QE1 and the first value FV are different, the display driver 210 outputs the write request WR to the memory 116.

In step S120, the display driver 210 outputs the second read request RD2 to the memory 116 based on the output of the write request WR.

In step S121, the memory 116 outputs the second data value QE2 to the display driver 210 in response to the second read request RD2.

In step S122, the display driver 210 compares the second data value QE2 with the first value FV.

In step S123, when the second data value QE2 and the first value FV are different, the display driver 210 outputs the power request PR to the application processor 30.

In step S124, the application processor 30 powers off the display driver 210 in response to the power request PR.

In step S125, the application processor 30 powers off the memory 116 in response to the power request PR.

In FIG. 5, step S125 is performed after step S124, but the disclosure is not limited thereto. According to embodiments, step S125 may be performed before step S124, and step S124 and step S125 may be performed together.

In step S126, the application processor 30 powers off the display driver 210 and then powers on the display driver 210.

In step S127, the application processor 30 may power off the memory 116 and then power on the memory 116.

In FIG. 5, step S127 is performed after step S126, but the disclosure is not limited thereto. According to embodiments, step S127 may be performed before step S126, and step S126 and step S127 may be performed together.

In step S130, the display driver 210 outputs a third read request RD3 to the memory 116 in response to being powered on. The third read request RD3 may be a request to check a value of the state data QE of the memory 116.

In step S131, the memory 116 outputs a third data value QE3 to the display driver 210 in response to the third read request RD3. The third data value QE3 may be a value of state data QE read in response to the third read request RD3.

In step S132, the display driver 210 compares the third data value QE3 with the first value FV.

In embodiments, when the third data value QE3 is different from the first value FV, the memory 116, the display driver 210, and the application processor 30 may perform steps S123 to S132 again.

In embodiments, when the third data value QE3 is the same as the first value FV, the display driver 210 may output the driving data BD to the memory 116. The display driver 210 may periodically transmit the driving data BD to the memory 116 until entering the sleep-in mode.

Figure 6:
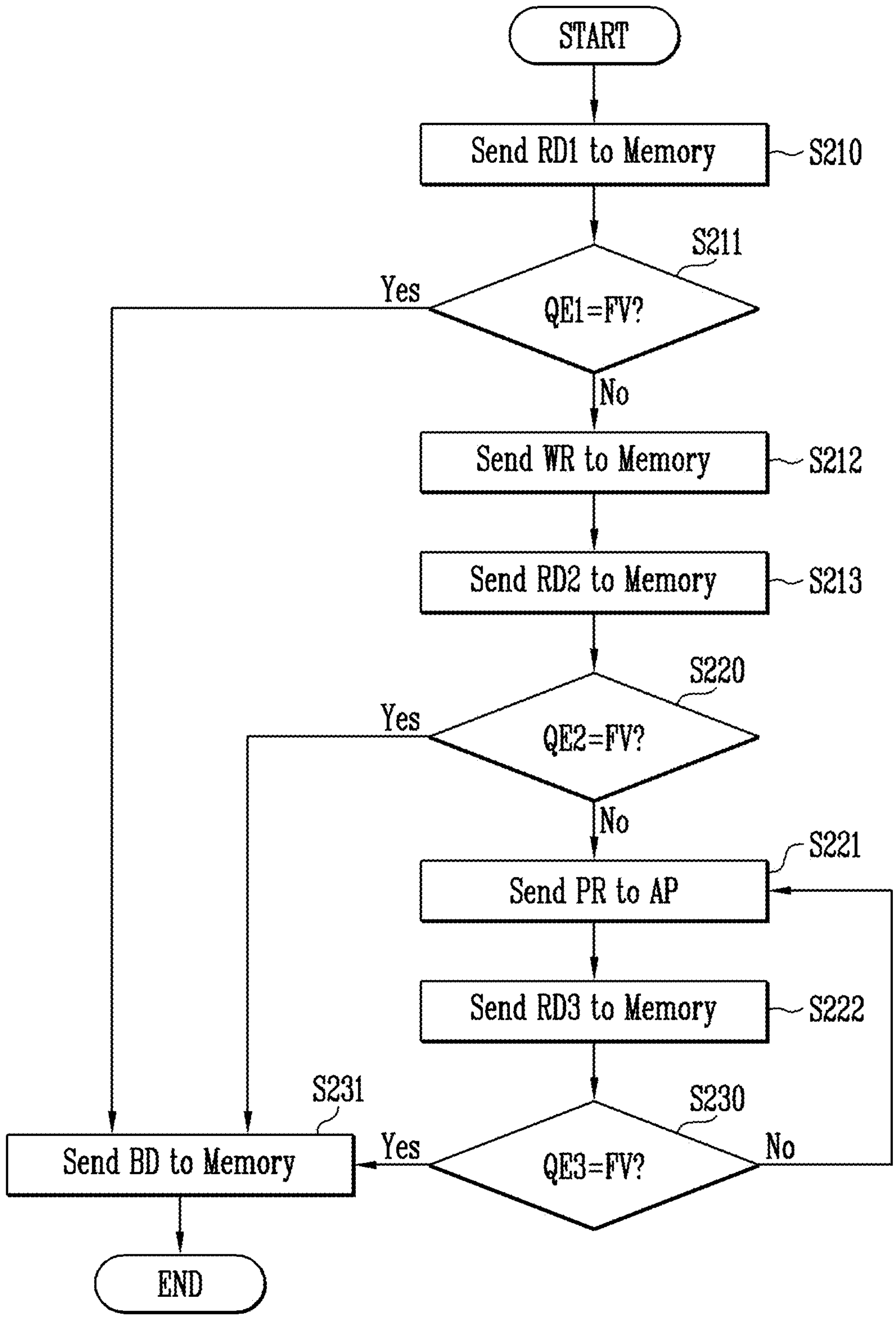
FIG. 6 is a diagram illustrating a method of operating the display driver according to an embodiment of the disclosure.

FIG. 6 is a diagram illustrating a method of operating a display driver according to an embodiment of the disclosure.

Referring to FIGS. 3, 4, and 6, a method of operating the display driver 210 is shown.

Steps S210, S211, and S212 may be similar to the first operation of FIG. 3. Steps S213, S220, and S221 may be similar to the second operation of FIG. 4. Accordingly, an overlapping description may be omitted.

In step S210, the display driver 210 transmits the first read request RD1 to the memory 116. The memory 116 may transmit the first data value QE1 to the display driver 210 in response to receipt of the first read request RD1. In embodiments, the display driver 210 may perform step S210 when entering the sleep-out mode.

In step S211, the display driver 210 compares the first data value QE1 with the first value FV. When the first data value QE1 and the first value FV are the same, the display driver 210 performs step S231. When the first data value QE1 and the first value FV are different, the display driver 210 performs step S212.

In step S212, the display driver 210 outputs the write request WR to the memory 116. The write request WR attempts to set the state data QE to the first value. If the memory 116 is not receiving enough power, this attempt could fail and then the state data QE might remain a value different from the first value such as the second value.

In step S213, the display driver 210 transmits the second read request RD2 to the memory 116 based on an output of the write request WR. In an embodiment, the memory 116 notifies the display driver 210 whether the write request WR was successful, and the display driver 210 transmits the second read request RD2 to the memory 116 when the write request WR was successful. The memory 116 may transmit a second data value QE2 to the display driver 210 in response to receipt of the second read request RD2.

In step S220, the display driver 210 compares the second data value QE2 with the first value FV. When the second data value QE2 and the first value FV are the same, the display driver 210 performs step S231. When the first data value QE1 and the first value FV are different, the display driver 210 performs step S221.

In step S221, the display driver 210 outputs the power request PR to the application processor 30. In embodiments, the application processor 30 powers off/on the display driver 210 and the memory 116 in response to the power request PR.

In step S222, the display driver 210 may transmit the third read request RD3 to the memory 116. The third read request RD3 may be a request to check the value of the state data QE of the memory 116. The memory 116 may transmit a third data value QE3 of the state data QE to the display driver 210 in response to receipt of the third read request RD3.

In step S230, the display driver 210 compares the third data value QE3 with the first value FV. The third data value QE3 may be the value of state data QE read in response to the third read request RD3.

When the third data value QE3 and the first value FV are the same, the display driver 210 may perform step S231. When the third data value QE3 and the first value FV are different, the display driver 210 may perform step S221. That is, the display driver 210 may continuously transmit the power request PR to the application processor AP until the state data QE is the same as the first value FV. In an embodiment, the display driver 210 continuously transmits the power request PR to the application processor AP a certain number of times while the state data QE is not the same as the first value FV and then records an error when this certain number exceeds a threshold value to prevent the system from continuously performing a power on/off.

In step S231, the display driver 210 transmits the driving data BD to the memory 116. In embodiments, the display driver 210 may periodically transmit the driving data BD to the memory 116 until entering the sleep-in mode.

The display driver 210 may operate the display unit 110 using driving data BD it periodically stores in the memory 116. However, if the display driver 210 is not able to communicate with the memory 116, the display device 1 may not operate properly. The memory 116 may include state data QE indicating whether communication between the display driver 210 and the memory 116 is possible. Thus, if the state data QE indicates communication is possible, the display driver 210 may continue to store the driving data BD in the memory 116. However, when the display driver 210 enters a sleep-in mode, the state data QE may inadvertently get set to indicate communication is not possible even though communication is possible. Thus, in an embodiment, when the display driver 210 enters a sleep-out mode (e.g., exits the sleep-in mode to enter the sleep-out mode), the display driver 210 reads a value of the state data QE in the memory 116 and sets the state data QE in the memory to indicate communication is possible when the read value indicates communication is not possible.

Although specific embodiments and applications are described herein, other embodiments and modifications may be derived from the above description. Therefore, the spirit of the disclosure is not limited to these embodiments, and extends to the scope of the claims set forth below, various obvious modifications, and equivalents.

What is claimed is:

1. A display device comprising:

a processor configured to provide input image data;

a display driver configured to display an image on a display panel based on the input image data and generate driving data for operating the display panel; and a memory configured to store the driving data and state data indicating whether communication with the display driver is possible, wherein the display driver determines whether the state data is a first value when entering a sleep-out mode from a sleep-in mode, and changes the state data to the first value when the state data is not the first value.

2. The display device according to claim 1, wherein the display driver outputs a first read request to the memory when entering the sleep-out mode, the memory outputs a first data value to the display driver based on the first read request, and the first data value is a value of the state data read in response to the first read request.

3. The display device according to claim 2, wherein when the first data value is not the first value, the display driver outputs a write request to the memory to set the state data in the memory to the first value.

4. The display device according to claim 3, wherein after outputting the write request as the state data, the display driver outputs a second read request to the memory, the memory outputs a second data value to the display driver based on the second read request, and the second data value is a value of the state data read in response to the second read request.

5. The display device according to claim 4, wherein when the second data value is not the first value, the display driver outputs a power request to the processor, and the power request is for requesting that a power-off/on of the display driver and the memory be performed.

6. The display device according to claim 5, wherein the processor powers off/on the display driver and the memory based on the power request, and the power-off/on turns off and then turns on the display driver and the memory, and the processor maintains a turn-on state.

7. The display device according to claim 5, wherein the display driver outputs the driving data to the memory when the second data value is the first value.

8. The display device according to claim 3, wherein the display driver outputs the driving data to the memory when the first data value is the first value.

9. The display device according to claim 1, wherein in the sleep-in mode, the processor is in a turn-on state and the display driver is in a turn-off state, and in the sleep-out mode, both the processor and the display driver are in a turn-on state.

10. The display device according to claim 1, wherein the driving data includes at least one of grayscale voltages provided to pixels of the display panel and accumulation stress for each pixel of the display panel.

11. A method of driving a display driver that receives input image data from a processor and communicates with a memory that stores state data, the method comprising:

determining whether the state data is a first value when entering a sleep-out mode from a sleep-in mode; and changing the state data to the first value when the state data is not the first value, wherein the state data indicates whether communication between the display driver and the memory is possible.

12. The method according to claim 11, wherein determining whether the state data is the first value when entering the sleep-out mode from the sleep-in mode comprises:

outputting a first read request to the memory when entering the sleep-out mode; and comparing the first value with a first data value read based on the first read request.

13. The method according to claim 12, further comprising:

outputting driving data to the memory when the first data value is the same as the first value, wherein the driving data indicates a state of the display panel based on the input image data.

14. The method according to claim 13, wherein the driving data includes at least one of grayscale voltages provided to pixels of the display panel and accumulation stress for each pixel of the display panel.

15. The method according to claim 12, further comprising:

outputting a write request for setting the state data in the memory to the first value, when the first data value is different from the first value.

16. The method according to claim 15, further comprising:

outputting a second read request to the memory after outputting the write request to the memory; and comparing the first value with a second data value read based on the second read request.

17. The method according to claim 16, further comprising:

outputting driving data to the memory when the second data value and the first value are the same, wherein the driving data indicates a state of the display panel based on the input image data.

18. The method according to claim 16, further comprising:

outputting a power request requesting that the display driver and the memory be powered off/on to the processor when the second data value is different from the first value.

19. The method according to claim 11, wherein in the sleep-in mode, the processor is in a turn-on state and the display driver is in a turn-off state, and in the sleep-out mode, both the processor and the display driver are in turn-on state.

20. A method of operating a display device including a display driver that displays an image on a display panel, and a memory that stores state data indicating whether communication with the display driver is possible, the method comprising:

determining whether the state data is a first value when entering a sleep-out mode from a sleep-in mode; and changing the state data to the first value when the state data is not the first value.

21. A display device comprising:

a processor configured to provide input image data;

a memory configured to store state data; and a display driver configured to store driving data in the memory for operating a display panel based on the input image data when the state data indicates communication is possible, and display an image on the display panel based on the input image data and the stored driving data, wherein the display driver reads a value of the state data in the memory and sets the state data in the memory to indicate communication is possible when the read value indicates communication is not possible, when entering a sleep-out mode from a sleep-in mode.

22. An electronic device comprising:

a processor configured to provide input image data; and a display device configured to display an image on a display panel based on the input image data, wherein the display device comprises:

a display driver generating driving data for operating the display panel; and a memory configured to store the driving data and state data indicating whether communication with the display driver is possible, wherein the display driver determines whether the state data is a first value when entering a sleep-out mode from a sleep-in mode, and changes the state data to the first value when the state data is not the first value.

* * * * *